(12) United States Patent
Fukuzawa

(10) Patent No.: US 12,548,110 B2
(45) Date of Patent: Feb. 10, 2026

(54) IMAGE DATA GENERATOR, LEAN VEHICLE, AND IMAGE DATA GENERATION METHOD

(71) Applicant: Robert Bosch GmbH, Stuttgart (DE)

(72) Inventor: Keiichiro Fukuzawa, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 178 days.

(21) Appl. No.: 18/251,481

(22) PCT Filed: Oct. 6, 2021

(86) PCT No.: PCT/IB2021/059171
§ 371 (c)(1),
(2) Date: May 2, 2023

(87) PCT Pub. No.: WO2022/101703
PCT Pub. Date: May 19, 2022

(65) Prior Publication Data
US 2023/0410248 A1 Dec. 21, 2023

(30) Foreign Application Priority Data
Nov. 11, 2020 (JP) .................................. 2020187646

(51) Int. Cl.
G06T 3/20 (2006.01)
G06T 3/60 (2024.01)
(Continued)

(52) U.S. Cl.
CPC ................. *G06T 3/20* (2013.01); *G06T 3/60* (2013.01); *G06T 7/70* (2017.01); *B60W 50/14* (2013.01);
(Continued)

(58) Field of Classification Search
CPC ...... B60W 30/09; B60W 30/14; B60W 50/14; B60W 2300/36; B60W 2420/403;
(Continued)

(56) References Cited

U.S. PATENT DOCUMENTS

2008/0198229 A1 8/2008 Hongo
2017/0154224 A1* 6/2017 Torii ......................... G06T 3/60
(Continued)

FOREIGN PATENT DOCUMENTS

EP 2578464 A1 4/2013
JP 2018076027 A 5/2018
(Continued)

OTHER PUBLICATIONS

International Search Report and Written Opinion for Application No. PCT/IB2021/059171 dated Jan. 21, 2022 (2 pages).

*Primary Examiner* — Logan M Kraft
*Assistant Examiner* — Johnny H Hoang
(74) *Attorney, Agent, or Firm* — Michael Best & Friedrich LLP

(57) ABSTRACT

An image data generator is for an assistance system. The assistance assists a driver with driving a lean vehicle. The image data generator can suppress a delay in initiation of rider assistance operation in an assistance system in comparison with conventional assistance systems.
The image data generator has an input section, a first data generating section, and a second data generating section. The input section receives an imaging data from an imaging device. The imaging device detects an environment around the lean vehicle. The first data generating section generates a first image data by shifting the imaging data in a vertical direction. The second data generating section generates a second image data by rotating the first image data.

13 Claims, 4 Drawing Sheets

(51) Int. Cl.
 *G06T 7/70* (2017.01)
 *B60W 50/14* (2020.01)
(52) U.S. Cl.
 CPC .................... *B60W 2300/36* (2013.01); *G06T 2207/30244* (2013.01); *G06T 2207/30252* (2013.01)
(58) Field of Classification Search
 CPC . B60T 7/22; B60T 8/24; B60T 8/3225; B60T 2201/022; B60T 2230/03; G06T 7/70; G06T 3/60; G06T 2207/30244
 See application file for complete search history.

(56) References Cited

U.S. PATENT DOCUMENTS

| | | | |
|---|---|---|---|
| 2018/0354442 A1* | 12/2018 | Bergstrom | ................ B60R 1/06 |
| 2019/0098953 A1 | 4/2019 | Strickland | |
| 2020/0247431 A1* | 8/2020 | Ferencz | ............. G01C 21/3407 |
| 2020/0317126 A1* | 10/2020 | Watanabe | ............ B62D 15/027 |
| 2021/0319535 A1* | 10/2021 | Tokunaga | ................ G06F 3/14 |
| 2022/0017104 A1* | 1/2022 | Higuchi | .............. B60T 8/17636 |
| 2022/0176947 A1* | 6/2022 | Hart | ........................ G06T 7/593 |

FOREIGN PATENT DOCUMENTS

| | | | |
|---|---|---|---|
| WO | 2015174208 A1 | 11/2015 | |
| WO | 2019186799 A1 | 10/2019 | |

\* cited by examiner

[FIG. 1]
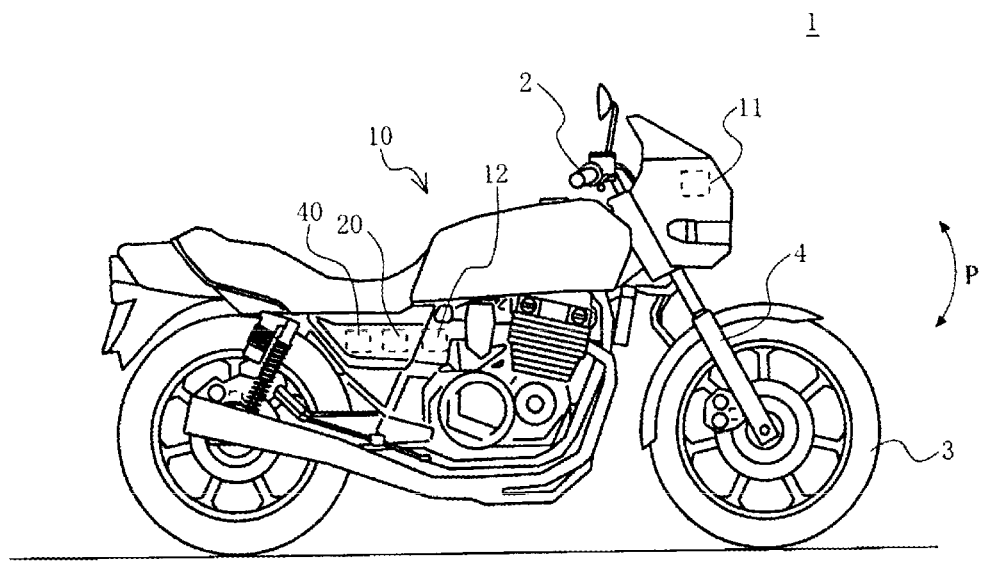
[FIG. 2]
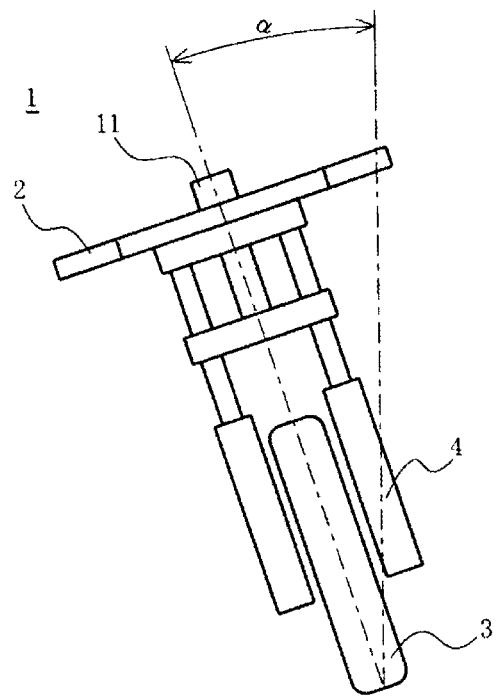

[FIG. 3]
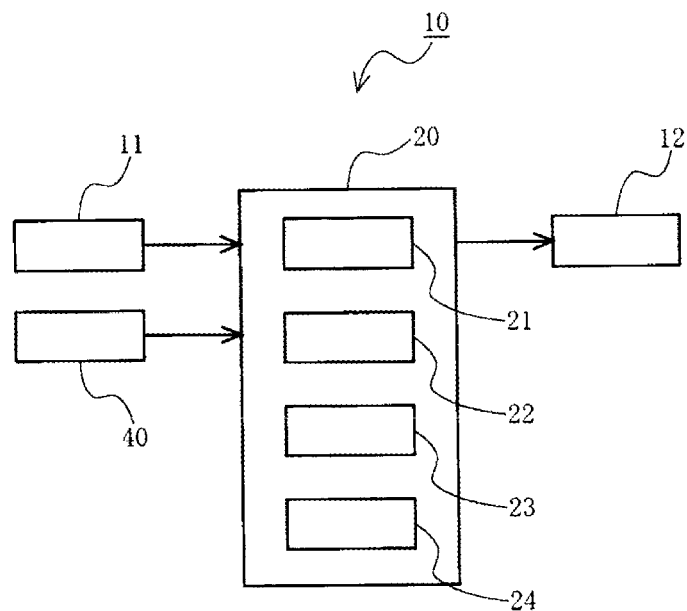
[FIG. 4]
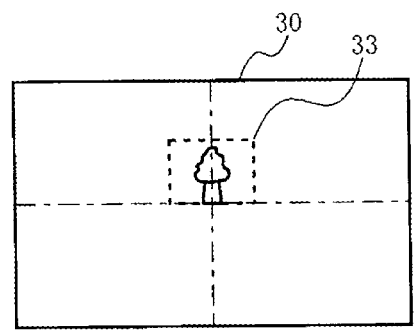
[FIG. 5]
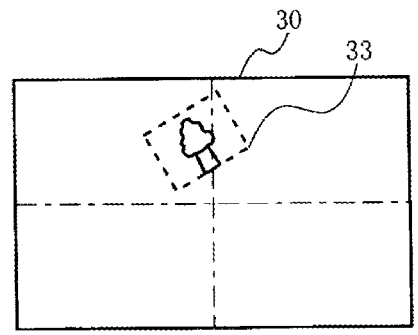

[FIG. 6]
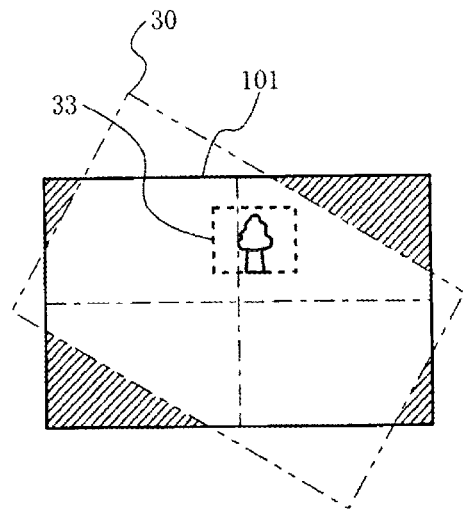
[FIG. 7]
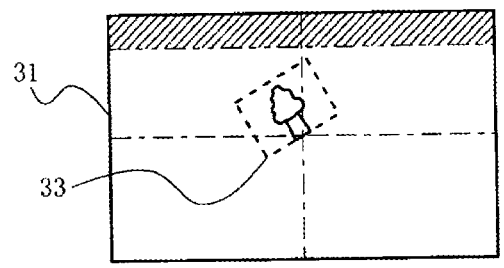
[FIG. 8]
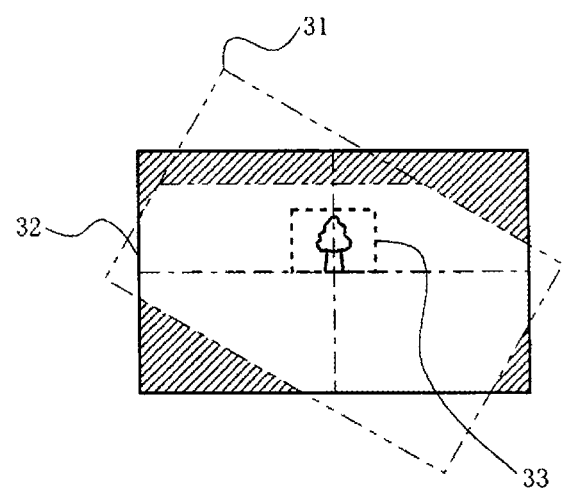

[FIG. 9]
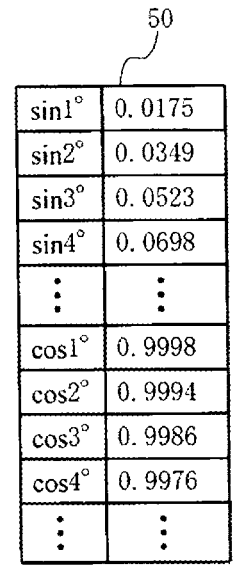
[FIG. 10]
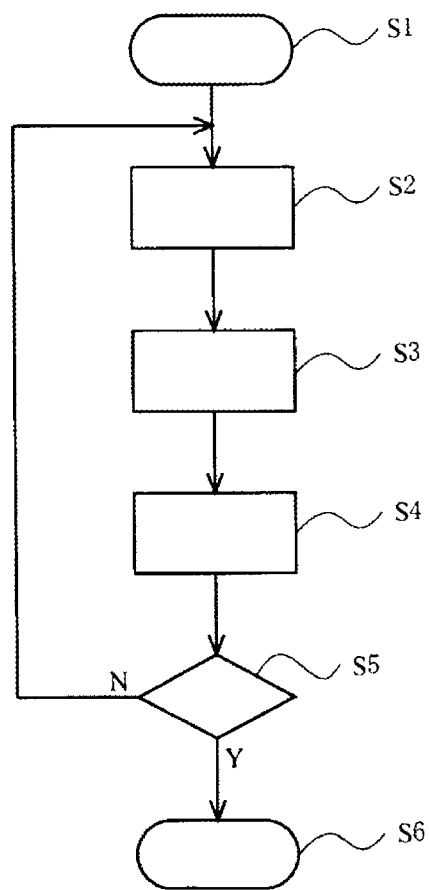

IMAGE DATA GENERATOR, LEAN VEHICLE, AND IMAGE DATA GENERATION METHOD

BACKGROUND

The present disclosure relates to an image data generator for an assistance system. The assistance system assists a rider with driving a lean vehicle. As another aspect, the present disclosure relates to a lean vehicle having the image data generator. As another aspect, the present disclosure relates to an image data generation method for an assistance system. The assistance system assists a rider with driving a lean vehicle.

Various assistance systems are known to be mounted in a lean vehicle such as a two-wheeled motor vehicle. The assistance systems assist a rider with driving the two-wheeled motor vehicle. The assistance system detects an environment around the two-wheeled motor vehicle based on imaging data from an imaging device. The imaging device is mounted in the two-wheeled motor vehicle. In response to the detection results from the imaging device, the assistance system performs various operations (e.g., a warning function, an emergency braking function, a cruise travel function) for assisting a driver with driving the two-wheeled motor vehicle. Here, the lean vehicle is a vehicle that has a body coming to be tilted along a turning direction when the vehicle makes a turn.

As described above, the body of the lean vehicle is tilted in the turning direction during the turn. Thus, when the lean vehicle is tilted, the imaging data of the imaging device comes to be also tilted. For this reason, when the imaging data from the imaging device is tilted, the conventional assistance systems adjusts the imaging data by rotating the imaging data and determines whether the drive assistance is required (i.e., determines whether there is necessity of the drive assistance) based on the adjusted imaging data. WO2015174208 describes such a conventional technique.

SUMMARY

The lean vehicle is short in body length. Thus, a pitch of the lean vehicle tends to be large. Since the imaging device is mounted in the lean vehicle, the large pitch results in shifting an optical axis of the imaging device along a pitching direction with a great degree. In other words, when the pitch occurs in the lean vehicle when the lean vehicle is tilted, a central point located at the center in the imaging data captured before the lean vehicle becomes tilted may be shifted along a vertical direction and may not be at the center. As such, the imaging device is required to generate a larger imaging data (e.g., an imaging data being large in pixels) so that the imaging data is large enough to determine whether the drive assist is required even when the pitch occurs in the lean vehicle. However, when the imaging device generates such a large imaging data, the large imaging data may includes an excess area which will be adjusted by being rotated although the excess area is not necessary to determine whether the drive assist is required. The excess area may result in increasing calculation steps. Such calculation steps performed to rotate the imaging data include calculations relating to sine and cosine and take much time. Therefore, according to conventional assistance systems, a delay in initiation of rider assistance operations tends to be large.

The present disclosure addresses the above issues, and it is an objective of the present disclosure to provide an image data generator for an assistance system. The assistance system assists a rider with driving a lean vehicle. According to the present disclosure, the image data generator can shorten a delay in initiation of a rider assistance operation performed in the assistance system as compared to conventional assistance systems. As another aspect, it is an objective of the present disclosure to provide a lean vehicle having the image data generator. As another aspect, it is an objective of the present disclosure to provide an image data generation method for an assistance system. The assistance system assists a rider with driving a lean vehicle. According to the image data generation method of the present disclosure, a delay in initiation of a rider assistance operation can be shortened as compared to the conventional assistance systems.

As one aspect of the present disclosure, the present disclosure relates to an image data generator for an assistance system. The assistance system assists a rider with driving a lean vehicle. The image data generator has an input section, a first data generating section, and a second data generating section. The input section is configured to receive an imaging data from an imaging device. The imaging device is configured to detect an environment around the lean vehicle. The first data generating section is configured to generate a first image data by shifting the imaging data in a vertical direction. The second data generating section is configured to generate a second image data by rotating the first image data.

As one aspect of the present disclosure, a lean vehicle may include the image data generator.

As one aspect of the present disclosure, the present disclosure relates to an image data generation method for an assistance system. The assistance system assists a rider with driving a lean vehicle. The image data generation method including: imputing an imaging data detected by an imaging device wherein the imaging device is configured to detects an environment around the lean vehicle; generating a first image data by shifting the image data along a vertical direction; and generating a second image data by rotating the first image data.

According to the present disclosure, the first image data is generated by shifting the imaging data from the imaging device along the vertical direction. Subsequently, the second image data is generated by rotating the first image data. The present disclosure determines whether the drive assist is required based on the second image data. Since the second image data is generated after shifting the imaging data along the vertical direction, calculation steps for rotating the imaging data can be reduced. Such calculation steps for rotating the imaging data may require a lot of time. That is, reducing the calculation steps for rotating the imaging data results in shortening time for rotating the imaging data. Thus, according to the present disclosure, the delay in initiation of a rider assistance operation can be shortened as compared to the conventional assistance systems.

BRIEF DESCRIPTION OF THE DRAWINGS

FIG. 1 is a side view of a lean vehicle to which an image data generator according to an embodiment of the present disclosure is mounted.

FIG. 2 is a schematic view in which, in a state where the lean vehicle according to the embodiment of the present disclosure is tilted to a side, a portion around a front wheel of the lean vehicle is observed from front of the lean vehicle.

FIG. 3 is a block diagram illustrating an example of an assistance system that includes the image data generator according to the embodiment of the present disclosure.

FIG. 4 is a view illustrating an example of imaging data of an imaging device in the assistance system that includes the image data generator according to the embodiment of the present disclosure.

FIG. 5 is a view illustrating an example of the imaging data of the imaging device in the assistance system that includes the image data generator according to the embodiment of the present disclosure.

FIG. 6 is a view for illustrating second data generating of the imaging data by a conventional assistance system.

FIG. 7 is a view illustrating an example of first image data that is calculated by a first data generating section in the image data generator according to the embodiment of the present disclosure.

FIG. 8 is a view illustrating an example of second image data that is calculated by a second data generating section in the image data generator according to the embodiment of the present disclosure.

FIG. 9 illustrates an example of a table that is stored in a storage section of the image data generator according to the embodiment of the present disclosure.

FIG. 10 is a chart illustrating a control flow of an example of operation of the image data generator according to the embodiment of the present disclosure.

DETAILED DESCRIPTION

A description will hereinafter be made on an image data generator, a lean vehicle, and an image data generation method according to the present disclosure with reference to the drawings.

A configuration, operation, and the like, which will be described below, constitute merely one example of the present disclosure, and the present disclosure is not limited to a case with such a configuration, such operation, and the like.

For example, in the following description, a two-wheeled motor vehicle is exemplified as the lean vehicle. However, the lean vehicle means a vehicle in general whose body is tilted in a turning direction during a turn. Thus, the lean vehicle is not limited to the two-wheeled motor vehicle. For example, the lean vehicles include motorcycles whose bodies are tilted in the turning direction during the turn (the two-wheeled motor vehicle and a three-wheeled motor vehicle whose body is tilted in the turning direction during the turn), pedal-driven vehicles, and the like. In addition, the motorcycle whose body is tilted in the turning direction during the turn may have an engine as a propelling source or may have an electric motor as the propelling source, and examples of the motorcycle are a bike, a scooter, and an electric scooter. The pedal-driven vehicle may be a vehicle that can travel forward on a road by a depression force applied to pedals by a rider. The pedal-driven vehicles include a normal pedal-driven vehicle, an electrically-assisted pedal-driven vehicle, an electric pedal-driven vehicle, and the like.

The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

A description will hereinafter be made on an image data generator according to an embodiment, a lean vehicle that includes the image data generator, and an image data generation method according to the embodiment.

<Configuration of Lean Vehicle to which Image Data Generator is Mounted>

A description will be made on the image data generator according to the embodiment and a configuration of the lean vehicle that includes the image data generator.

FIG. 1 is a side view of the lean vehicle to which the image data generator according to the embodiment of the present disclosure is mounted. FIG. 2 is a schematic view in which, in a state where the lean vehicle according to the embodiment of the present disclosure is tilted to a side, a portion around a front wheel of the lean vehicle is observed from front of the lean vehicle. In FIG. 1, a right side of the sheet corresponds to a front side of a lean vehicle 1.

The lean vehicle 1 is the two-wheeled motor vehicle, for example. The lean vehicle 1 includes a front wheel 3 and a handlebar 2 that is connected to the front wheel 3 and functions as an operation section of the front wheel 3. In addition, in this embodiment, the lean vehicle 1 includes a suspension 4 between a body and the front wheel 3.

To the lean vehicle 1, an assistance system 10 that assists with a driver with driving the lean vehicle 1 is mounted. This assistance system 10 includes an imaging device 11, an image data generator 20, and a controller 12. The imaging device 11 detects an environment around the lean vehicle 1 (captures an image of surroundings). In this embodiment, the imaging device 11 at least detects an environment (captures the image of the surroundings) in front of the lean vehicle 1. The image data generator 20 uses imaging data of the imaging device 11 to generate image data that is used in the assistance system 10. A detailed configuration of the image data generator 20 will be described below.

The controller 12 examines necessity of operation (for example, a warning function, an emergency braking function, a cruise travel function, and the like) to assist the rider with driving the lean vehicle 1 based on the image data generated by the image data generator 20, and performs the assistance operation when necessary. For example, the controller 12 is partially or entirely constructed of a microcomputer, a microprocessor unit, or the like. Alternatively, the controller 12 may partially or entirely be constructed of a member in which firmware or the like can be updated, or may partially or entirely be a program module or the like that is executed by a command from a CPU or the like, for example. The controller 12 may be provided as one unit or may be divided into multiple units, for example.

A travel state detector 40 illustrated in FIG. 1 detects a travel state of the lean vehicle 1, and a detailed description thereon will be made below.

As illustrated in FIG. 2, the body of the lean vehicle 1 is tilted in the turning direction during the turn. FIG. 2 illustrates the lean vehicle 1 that is tilted at a lean angle α in the turning direction.

FIG. 3 is a block diagram illustrating an example of the assistance system that includes the image data generator according to the embodiment of the present disclosure.

The image data generator 20 generates the image data based on the imaging data. More specifically, the image data generator 20 generates the image data in response to detection results from the travel state detector 40 that detects information about the travel state of the lean vehicle 1. The assistance system 10 refers the image data generated by the image data generator 20.

The travel state detector 40 includes at least one detection unit. The detection unit that constitutes the travel state detector 40 may be a detection unit that is provided exclusively for the travel state detector 40. Alternatively, a detection unit that is used for another application may also be used as the detection unit of the travel state detector 40.

For example, the travel state detector 40 includes a detection unit that detects posture information of the lean vehicle 1 in a pitching direction. The pitching direction is a direction that is indicated by an arcuate arrow P in FIG. 1.

For example, the travel state detector 40 includes, as the detection unit that detects the posture information of the lean vehicle 1 in the pitching direction, a detection unit that detects a pitching angle of the lean vehicle 1. This is because the pitching angle of the lean vehicle 1 changes when a posture of the lean vehicle 1 in the pitching direction changes. Here, the detection unit that detects the pitching angle of the lean vehicle 1 may detect a physical quantity that can substantially be converted into the pitching angle of the lean vehicle 1. In this embodiment, the travel state detector 40 includes an inertial measurement unit as the detection unit that detects the pitching angle of the lean vehicle 1, and detects the pitching angle of the lean vehicle 1 by the inertial measurement unit. The inertial measurement unit includes a three-axis gyroscope sensor and a three-directional acceleration sensor and outputs detection results of three-axis acceleration and three-axis angular velocities of the lean vehicle 1.

Alternatively, for example, the detection unit that is included in the travel state detector and detects the posture information of the lean vehicle 1 in the pitching direction may be a detection unit that detects an expansion/compression amount of the suspension 4 on a side of the front wheel 3 of the lean vehicle 1. This is because the expansion/compression amount of the suspension 4 changes when the posture of the lean vehicle 1 in the pitching direction changes. More specifically, the compression amount of the suspension 4 is increased in a state where a sinking amount of a front portion of the body of the lean vehicle 1 with respect to a rear portion is increased. Meanwhile, the expansion amount of the suspension 4 is increased in a state where a lifting amount of the front portion of the body of the lean vehicle 1 with respect to the rear portion is increased. Here, the detection unit that detects the expansion/compression amount of the suspension 4 may detect a physical quantity that can substantially be converted into the expansion/compression amount of the suspension 4.

Alternatively, for example, the detection unit that is included in the travel state detector and detects the posture information of the lean vehicle 1 in the pitching direction may be a detection unit that detects acceleration/deceleration of the lean vehicle 1 in a front-rear direction. This is because the acceleration/deceleration of the lean vehicle 1 in the front-rear direction changes when the posture of the lean vehicle 1 in the pitching direction changes. More specifically, as the deceleration of the lean vehicle 1 is increased during forward travel, the sinking amount of the front portion of the body of the lean vehicle 1 with respect to the rear portion is increased. Meanwhile, as the acceleration of the lean vehicle 1 is increased during the forward travel, the lifting amount of the front portion of the body of the lean vehicle 1 with respect to the rear portion is increased. Here, the detection unit that detects the acceleration/deceleration of the lean vehicle 1 in the front-rear direction may detect a physical quantity that can substantially be converted into the acceleration/deceleration of the lean vehicle 1 in the front-rear direction. In this embodiment, the above-described inertial measurement unit is used as the detection unit that detects the acceleration/deceleration of the lean vehicle 1 in the front-rear direction. The acceleration/deceleration of the lean vehicle 1 in the front-rear direction may be detected from a change amount per unit time of a speed of the lean vehicle 1.

Alternatively, for example, the travel state detector 40 includes a detection unit that detects a steering angle of the lean vehicle 1. Here, the detection unit that detects the steering angle of the lean vehicle 1 may detect a physical quantity that can substantially be converted into the steering angle of the lean vehicle 1.

For example, the imaging device 11 may be used as the detection unit that is included in the travel state detector 40.

Alternatively, for example, the travel state detector 40 includes a detection unit that detects the posture information of the lean vehicle 1 in a tilting direction. Here, the tilting direction is a direction illustrated in FIG. 2 and is a direction in which the lean vehicle 1 is tilted to the side.

For example, the travel state detector 40 includes, as the detection unit that detects the posture information of the lean vehicle 1 in the tilting direction, a detection unit that detects at least one of a lean angle, a yaw rate, and lateral acceleration of the lean vehicle 1. Here, the detection unit that detects at least one of the lean angle, the yaw rate, and the lateral acceleration of the lean vehicle 1 may detect a physical quantity that can substantially be converted into such information. The lean angle of the lean vehicle 1 is increased as the lean vehicle 1 is tilted to the side. In addition, the lean vehicle 1 is tilted during the turn in most of the cases. During the turn of the lean vehicle 1, the yaw rate and the lateral acceleration of the lean vehicle 1 are substantially increased/reduced according to an increase/reduction in the lean angle of the lean vehicle 1. For this reason, any of the lean angle, the yaw rate, and the lateral acceleration of the lean vehicle 1 can be used as the posture information of the lean vehicle 1 in the tilting direction.

In the case where the travel state detector 40 detects at least two of the lean angle, the yaw rate, and the lateral acceleration of the lean vehicle 1, the travel state detector 40 may include separate detection units, each of which detects respective one type of the information, or may include a single detection unit that detects at least two of these types of the information. In this embodiment, the travel state detector 40 uses the above-described inertial measurement unit as the detection unit that detects the posture information of the lean vehicle 1 in the tilting direction.

For example, the image data generator 20 is partially or entirely constructed of a microcomputer, a microprocessor unit, or the like. Alternatively, the image data generator 20 may partially or entirely be constructed of a member in which firmware or the like can be updated, or may partially or entirely be a program module or the like that is executed by a command from a CPU or the like, for example. The image data generator 20 may be provided as one unit or may be divided into multiple units, for example. In addition, at least a part of the image data generator may be formed integrally with at least a part of the controller 12. In this embodiment, the image data generator 20 includes, as functional sections, an input section 21, a first data generating section 22, and a second data generating section 23. The image data generator 20 according to this embodiment also includes a storage section 24 as the functional section.

The input section 21 receives the imaging data of the imaging device 11 that detects the environment around the lean vehicle 1. For example, the imaging data of the imaging device 11 is as follows.

Each of FIG. 4 and FIG. 5 is a view illustrating an example of the imaging data of the imaging device in the assistance system that includes the image data generator according to the embodiment of the present disclosure.

Imaging data 30 of the imaging device 11 illustrated in FIG. 4 is imaging data at the time when a pitch of the lean vehicle 1 does not occur in a forward straight travel state (a non-tilted state) of the lean vehicle 1. Here, in this embodiment, the imaging device 11 is mounted to the lean vehicle 1 such that a vanishing point is substantially located at a center of the imaging data 30. In addition, a portion around a center position of the imaging data 30 corresponds to an area 33 that is required to determine necessity of drive assistance in the assistance system 10. Here, a position and size of the area 33 that is required to determine the necessity of the drive assistance merely constitute one example.

In the imaging data 30 illustrated in FIG. 4, a tree that is stretched out perpendicularly is shown. A root of this tree is at the center position of the imaging data 30 illustrated in FIG. 4. This tree is also shown in the imaging data 30 illustrated in FIG. 5 and image data, which will be described below. That is, in the imaging data 30 illustrated in FIG. 5 and the image data, which will be described below, the root of this tree corresponds to the position at the center in the imaging data 30 illustrated in FIG. 4 (the imaging data in a state where the pitch of the lean vehicle 1 does not occur).

Here, the body of the lean vehicle 1 is tilted in the turning direction during the turn. Thus, in the tilted state of the lean vehicle 1, the imaging data 30 of the imaging device 11, which is mounted to the lean vehicle 1, is also tilted. In addition, the lean vehicle 1 has a short body length. Thus, the pitch of the lean vehicle 1 is large. Then, when the posture information of the lean vehicle 1 in the pitching direction changes, in the imaging data 30 of the imaging device 11, the position that is located at the center prior to the occurrence of the pitch moves in a vertical direction. As a result, when the pitch occurs to the lean vehicle 1 during the turn, the imaging data 30 becomes the imaging data as illustrated in FIG. 5.

In the conventional assistance system, mounting of which to the lean vehicle is proposed, the tilted imaging data 30 illustrated in FIG. 5 is rotationally converted as follows and is used to examine the necessity of the assistance operation for the rider of the lean vehicle 1.

FIG. 6 is a view for illustrating the second data generation of the imaging data by the conventional assistance system. A hatched portion illustrated in the image data 101 of FIG. 6 is a portion that loses image information when the tilted imaging data 30 illustrated in FIG. 5 is rotationally converted. This is because, in the image data after the second data generation, only coordinate positions, at each of which the image information exists before and after the second data generation, remain as the image.

When generating the image data 101 illustrated in FIG. 6 from the imaging data 30 illustrated in FIG. 5, the conventional assistance system rotates the imaging data 30 with the center of the imaging data 30 illustrated in FIG. 5 as a rotation center according to the tilt of the imaging data 30. Just as described, when rotationally converting the tilted imaging data 30 illustrated in FIG. 5, the conventional assistance system has to rotationally convert an area portion, which is unnecessary to determine the necessity of the drive assistance, in the imaging data 30. As a result, a calculation amount is increased. In addition, calculation at the time of the second data generation of the tilted imaging data 30 illustrated in FIG. 5 is calculation of sines and cosines and thus takes time. Thus, in the conventional assistance system, a delay in initiation of the rider assistance operation is increased.

Meanwhile, the image data generator 20 according to this embodiment generates the image data that is used to examine the necessity of the rider assistance operation by the first data generating section 22 and the second data generating section 23. Thus, as will be described below, it is possible to suppress a delay in initiation of the rider assistance operation in the assistance system 10 in comparison with the conventional assistance system.

The first data generating section 22 calculates the first image data by subjecting the imaging data 30 of the imaging device 11 to first data generation at least in the vertical direction. More specifically, when the pitch occurs to the lean vehicle 1 in the tilted state of the lean vehicle 1, the first data generating section 22 calculates the first image data by subjecting the imaging data 30 of the imaging device 11 to the first data generation at least in the vertical direction. Furthermore specifically, when the pitch occurs to cause the front portion of the body of the lean vehicle 1 to sink with respect to the rear portion, the first data generating section 22 calculates the first image data by subjecting the imaging data 30 of the imaging device 11 to the first data generation at least in a down direction. Meanwhile, when the pitch occurs to cause the front portion of the body of the lean vehicle 1 to lift with respect to the rear portion, the first data generating section 22 calculates the first image data by subjecting the imaging data 30 of the imaging device 11 to the first data generation at least in an up direction. That is, the first data generating section 22 calculates the first image data by subjecting the imaging data 30 illustrated in FIG. 5 to the first data generation at least in the vertical direction.

FIG. 7 is a view illustrating an example of the first image data that is calculated by the first data generating section in the image data generator according to the embodiment of the present disclosure. This first image data 31 illustrated in FIG. 7 is calculated by using the imaging data 30 illustrated in FIG. 5. A hatched portion illustrated in the first image data 31 of FIG. 7 is a portion that loses the image information since the image information does not exist in the corresponding portion in the imaging data 30 illustrated in FIG. 5.

As it is understood from comparison between the first image data 31 illustrated in FIG. 7 and the imaging data 30 illustrated in FIG. 5, compared to the center of the imaging data 30 illustrated in FIG. 5, a center of the first image data 31 illustrated in FIG. 7 is located near the position that is the center of the imaging data 30 in the state where the pitch does not occur to the lean vehicle 1 (the position at the center of the imaging data 30 in FIG. 4 and the position of the root of the tree).

For example, a shift amount between the imaging data 30 and the first image data 31 may have a fixed value. In this case, for example, it is assumed that an amount of the pitch causing the front portion of the body of the lean vehicle 1 to sink with respect to the rear portion becomes equal to or larger than a prescribed pitch amount, the first data generating section 22 calculates the first image data 31 by subjecting the imaging data 30 to the first data generation in the down direction by a prescribed value. Meanwhile, for example, it is assumed that an amount of the pitch causing the front portion of the body of the lean vehicle 1 to lift with respect to the rear portion becomes equal to or larger than the prescribed pitch amount, the first data generating section 22 calculates the first image data 31 by subjecting the imaging data 30 to the first data generation in the up direction by the prescribed value.

In addition, the first data generating section 22 can determine the shift amount between the imaging data 30 and the first image data 31 based on the posture information of the lean vehicle 1 in the pitching direction. That is, the first data generating section 22 may determine the shift amount between the imaging data 30 and the first image data 31 to a larger value in a state where the pitch amount of the lean vehicle 1 is increased. More specifically, in the state where the amount of the pitch that causes the front portion of the body of the lean vehicle 1 to sink with respect to the rear portion is increased, when calculating the first image data 31, the first data generating section 22 moves the imaging data 30 significantly in the down direction. Meanwhile, for example, in the state where the amount of the pitch that causes the front portion of the body of the lean vehicle 1 to lift with respect to the rear portion is increased, when calculating the first image data 31, the first data generating section 22 moves the imaging data 30 significantly in the up direction.

An appropriate method for changing the shift amount between the imaging data 30 and the first image data 31 is adopted. As the pitch amount of the lean vehicle 1 is increased, the shift amount between the imaging data 30 and the first image data 31 may be increased linearly, or the shift amount between the imaging data 30 and the first image data 31 may be increased stepwise. The shift amount between the imaging data 30 and the first image data 31 is determined based on the posture information of the lean vehicle 1 in the pitching direction. In this way, compared to the center of the imaging data 30 in the state where the pitch occurs to the lean vehicle 1, the center of the first image data 31 is located near the position that is the center of the imaging data in the state where the pitch does not occur to the lean vehicle 1 (the position at the center of the imaging data 30 in FIG. 4 and the position of the root of the tree).

For example, as the posture information of the lean vehicle 1 in the pitching direction, the first data generating section 22 uses the pitching angle of the lean vehicle 1. That is, in the state where the pitching angle in a direction of causing the front portion of the body of the lean vehicle 1 to sink with respect to the rear portion is increased, when calculating the first image data 31, the first data generating section 22 moves the imaging data 30 significantly in the down direction. Meanwhile, in the state where the pitching angle in a direction of causing the front portion of the body of the lean vehicle 1 to lift with respect to the rear portion is increased, when calculating the first image data 31, the first data generating section 22 moves the imaging data 30 significantly in the up direction.

For example, as the posture information of the lean vehicle 1 in the pitching direction, the first data generating section 22 uses the expansion/compression amount of the suspension 4 on the side of the front wheel 3 of the lean vehicle 1. That is, in the state where the compression amount of the suspension 4 is increased, when calculating the first image data 31, the first data generating section 22 moves the imaging data 30 significantly in the down direction. Meanwhile, in the state where the expansion amount of the suspension 4 is increased, when calculating the first image data 31, the first data generating section 22 moves the imaging data 30 significantly in the up direction.

For example, as the posture information of the lean vehicle 1 in the pitching direction, the first data generating section 22 uses the acceleration/deceleration of the lean vehicle 1 in the front-rear direction. That is, in the state where the deceleration of the lean vehicle 1 during the forward travel is increased, when calculating the first image data 31, the first data generating section 22 moves the imaging data 30 significantly in the down direction. Meanwhile, in the state where the acceleration of the lean vehicle 1 during the forward travel is increased, when calculating the first image data 31, the first data generating section 22 moves the imaging data 30 significantly in the up direction.

However, as the posture information of the lean vehicle 1 in the pitching direction, the first data generating section 22 may use at least two of the pitching angle of the lean vehicle 1, the expansion/compression amount of the suspension 4, and the acceleration/deceleration in the front-rear direction so as to determine the shift amount between the imaging data 30 and the first image data 31. In this way, compared to the center of the imaging data 30 in the state where the pitch occurs to the lean vehicle 1, the center of the first image data 31 is located further near the position that is the center of the imaging data in the state where the pitch does not occur to the lean vehicle 1 (the position at the center of the imaging data 30 in FIG. 4 and the position of the root of the tree).

Here, it is assumed that the imaging device 11 is configured to be directly provided to the handlebar 2 or is configured to be provided to a structure that moves with the handlebar 2. That is, it is assumed that the imaging device 11 moves with the handlebar 2 of the lean vehicle 1. In a case of such a configuration, when the handlebar 2 turns, in the imaging data 30, the position at the center of the imaging data in the state where the pitch does not occur to the lean vehicle 1 moves in an opposite direction of a right-left direction from a direction in which the handlebar 2 turns.

Accordingly, in the case where the first data generating section 22 uses at least one of the pitching angle of the lean vehicle 1, the expansion/compression amount of the suspension 4, and the acceleration/deceleration in the front-rear direction as the posture information of the lean vehicle 1 in the pitching direction, the first data generating section 22 may determine the shift amount (i.e., the shift amount in the right-left direction) between the imaging data 30 and the first image data 31 further based on the steering angle of the lean vehicle 1. In this way, compared to the center of the imaging data 30 in the state where the pitch occurs to the lean vehicle 1, the center of the first image data 31 is located further near the position that is the center of the imaging data in the state where the pitch does not occur to the lean vehicle 1 (the position at the center of the imaging data 30 in FIG. 4 and the position of the root of the tree).

For example, the first data generating section 22 may determine the shift amount between the imaging data 30 and the first image data 31 based on the imaging data 30 of the imaging device 11. By comparing the imaging data 30 in the state where the lean vehicle 1 is not tilted and the pitch does not occur thereto and the imaging data 30 in the state where the pitch occurs to the tilted lean vehicle 1, the first data generating section 22 can directly calculate the shift amounts in the vertical direction and the right-left direction between the imaging data 30 and the first image data 31. In this first embodiment, in the state where the lean vehicle 1 is not tilted and the pitch does not occur thereto, the vanishing point in the imaging data 30 is located at the center of the imaging data 30. Meanwhile, in the state where the pitch occurs to the tilted lean vehicle 1, the vanishing point is located off the center of the imaging data 30. In this embodiment, the shift amount between the imaging data 30 and the first image data 31 is determined based on displacement of this vanishing point.

In this embodiment, the first data generating section 22 calculates the first image data 31 by so-called inverse transformation. More specifically, the first data generating section 22 according to this embodiment is configured to receive coordinate information (pixel numbers, a pixel coordinate values, and the like) of the first image data 31 and calculate the first image data 31 by image conversion, by which the coordinate information of the imaging data 30 is output. By calculating the first image data 31 by the inverse transformation, it is possible to suppress a lack of an image to be produced in the first image data 31 at the time when the first image data 31 is generated by so-called forward transformation. It is needless to say that the first data generating section 22 can calculate the first image data 31 by the forward transformation. More specifically, the first data generating section 22 may be configured to receive the coordinate information of the imaging data 30 and calculate the first image data 31 by the image conversion, by which the coordinate information of the first image data 31 is output.

The second data generating section 23 calculates the second image data by rotationally converting the first image data 31. More specifically, the second data generating section 23 calculates the second image data by rotationally converting the first image data 31 in a direction of reducing a tilt of an imaged object. This second image data is used to examine the necessity of the drive assistance in the controller 12. That is, the second data generating section 23 calculates the second image data by rotationally converting the first image data 31 illustrated in FIG. 7.

FIG. 8 is a view illustrating an example of the second image data that is calculated by the second data generating section in the image data generator according to the embodiment of the present disclosure. This second image data 32 illustrated in FIG. 8 is calculated by using the first image data 31 illustrated in FIG. 7. A hatched portion illustrated in the second image data 32 of FIG. 8 is a portion that loses the image information when the first image data 31 illustrated in FIG. 7 is rotationally converted.

As it is understood from the image data 101 illustrated in FIG. 6 and the second image data 32 illustrated in FIG. 8, the portion that loses the image information in the second image data 32 illustrated in FIG. 8 is larger than the portion that loses the image information in the image data 101 illustrated in FIG. 6 by the portion that loses the image information at the time of generating the first image data 31. That is, compared to the image data 101 illustrated in FIG. 6, it is possible to reduce an amount of the calculation (the time-consuming calculation of the sines and the cosines) for the second data generation of the image data to generate the second image data 32 illustrated in FIG. 8.

In addition, as it is understood from the image data 101 illustrated in FIG. 6 and the second image data 32 illustrated in FIG. 8, in the image data after the second data generation, the image information around corners is lost. For this reason, in the case where the area 33, which is required to determine the necessity of the drive assistance, is located at or near the center in the image data prior to the second data generation, the image information in the area 33 is unlikely to be lost in the image data after the second data generation. Here, in the first image data 31, the area 33 that is required to determine the necessity of the drive assistance in the assistance system 10 is located at or near the center. Thus, as the imaging device 11 according to this embodiment, an imaging device with a smaller imaging range (the smaller number of the pixels) can be used. Also from this point, compared to the image data 101, it is possible to reduce the calculation amount for the second data generation of the image data to generate the second image data 32.

In addition, as described above, in the first image data 31, the area 33 that is required to determine the necessity of the drive assistance in the assistance system 10 is located at or near the center. Thus, the second image data 32 can be generated only by rotationally converting the portion around the center of the first image data 31. Also from this point, compared to the image data 101, it is possible to reduce the calculation amount for the second data generation of the image data to generate the second image data 32.

As described above, compared to the image data 101, it is possible to reduce the calculation amount for the second data generation of the image data to generate the second image data 32. Thus, with the image data generator 20 according to this embodiment, it is possible to suppress the delay in the initiation of the rider assistance operation in the assistance system 10 in comparison with the conventional assistance system.

Here, in the conventional assistance system, the calculation of the sines and the cosines is performed in a calculation library. It takes time to calculate the sines and the cosines in this calculation library. Accordingly, with the following configuration, the image data generator 20 according to this embodiment further reduces a calculation time for the second data generation of the first image data 31, so as to further suppress the delay in the initiation of the rider assistance operation in the assistance system 10.

FIG. 9 illustrates an example of a table that is stored in the storage section of the image data generator according to the embodiment of the present disclosure.

As described above, the image data generator 20 according to this embodiment includes the storage section 24. This storage section 24 stores a table 50 as illustrated in FIG. 9, for example, in which values of the sines at plural angles and values of the cosines at the plural angles are saved. Then, the second data generating section 23 is configured to use the table 50 when calculating the second image data 32. By referring to the value of the sine and the value of the cosine at the required angle from the table 50 at the time of the second data generation of the first image data 31, it is possible to reduce the calculation time for the second data generation of the first image data 31 in comparison with the case where the sine and the cosine are calculated in the calculation library. Thus, by using the table 50 at the time of calculating the second image data 32, it is possible to further suppress the delay in the initiation of the rider assistance operation in the assistance system 10.

Here, for example, a rotation amount between the first image data 31 and the second image data 32 may have a fixed value. In this case, for example, it is assumed that, when the tilt angle of the lean vehicle 1 becomes equal to or larger than a prescribed tilt angle, the second data generating section 23 generates the second image data 32 by rotationally converting the first image data 31 in a direction to reduce the tilt at a prescribed angle.

Alternatively, the second data generating section 23 may determine the rotation amount between the first image data 31 and the second image data 32 based on the posture information of the lean vehicle 1 in the tilting direction. That is, the second data generating section 23 may determine the rotation amount between the first image data 31 and the second image data 32 to a larger value in a state where the tilt angle of the lean vehicle 1 is increased.

An appropriate method for changing the rotation amount between the first image data 31 and the second image data 32 is adopted. As the tilt angle of the lean vehicle 1 is increased, the rotation amount between the first image data 31 and the second image data 32 may be increased linearly, or the rotation amount between the first image data 31 and the second image data 32 may be increased stepwise. By determining the rotation amount between the first image data 31 and the second image data 32 based on the posture information of the lean vehicle 1 in the tilting direction, the tilt of the second image data 32 is further reduced, and detection accuracy of the environment around the lean vehicle 1 is improved. Thus, assistance accuracy of the assistance system 10 is improved.

For example, as the posture information of the lean vehicle 1 in the tilting direction, the second data generating section 23 uses the lean angle of the lean vehicle 1. Alternatively, for example, as the posture information of the lean vehicle 1 in the tilting direction, the second data generating section 23 uses the yaw rate of the lean vehicle 1. Further alternatively, for example, as the posture information of the lean vehicle 1 in the tilting direction, the second data generating section 23 uses the lateral acceleration of the lean vehicle 1.

However, as the posture information of the lean vehicle 1 in the tilting direction, the second data generating section 23 may use at least two of the lean angle, the yaw rate, and the lateral acceleration of the lean vehicle 1 so as to determine the rotation amount between the first image data 31 and the second image data 32. In this way, the tilt angle of the lean vehicle 1 can further accurately be comprehended, and the tilt of the second image data 32 can further be reduced. Thus, the detection accuracy of the environment around the lean vehicle 1 is further improved, and the assistance accuracy of the assistance system 10 is further improved.

In this embodiment, the second data generating section 23 calculates the second image data 32 by the inverse transformation. More specifically, the second data generating section 23 according to this embodiment is configured to receive coordinate information of the second image data 32 and calculate the second image data 32 by the image conversion, by which the coordinate information of the first image data 31 is output. By calculating the second image data 32 by the inverse transformation, it is possible to suppress a lack of the image in the second image data 32 at the time of generating the second image data 32 by the forward transformation. It is needless to say that the second data generating section 23 can calculate the second image data 32 by the forward transformation. More specifically, the second data generating section 23 may be configured to receive the coordinate information of the first image data 31 and calculate the second image data 32 by the image conversion, by which the coordinate information of the second image data 32 is output.

<Operation of Image Data Generator>

A description will be made on operation of the image data generator 20 according to the embodiment.

FIG. 10 is a chart illustrating a control flow of an example of the operation of the image data generator according to the embodiment of the present disclosure.

When a control initiation condition is satisfied, in step S1, the image data generator 20 initiates control illustrated in FIG. 10. An example of the control initiation condition is that the tilt and the pitch occur to the lean vehicle 1.

The control flow advances to step S2 after step S1. Step S2 may be referred to as an input step imputing the imaging data (30). Specifically, at step S2, the input section 21 in the image data generator 20 receives the imaging data 30 of the imaging device 11. In other words, the imaging data 30 is input to the input section 21.

The control flow advances to step 3 after step 2. Step S3 may be referred to as a first data generating step generating the first image data 31. Specifically, at step S3, the first data generating section 22 in the image data generator 20 generates (i.e., calculates) the first image data 31 by shifting the imaging data 30 at least along the vertical direction by any of the above-described methods.

The control flow advances to step S4 after step S3. Step S4 may be referred to as a second data generating step generating the second image data 32. Specifically, at step S4, the second data generating section 23 in the image data generator 20 generates (i.e., calculates) the second image data 32 by rotating the first image data 31 by any of the above-described methods. In the controller 12, the second image data 32 is used to determine whether it is necessary to operate a rider assistance to assist the rider with driving.

The control flow advances to step S5 after step S4. Step S5 may be referred to as a termination determination step. At step S5, the image data generator 20 determines whether a control termination condition is satisfied. The control termination condition is that the tilt or the pitch no longer occurs to the lean vehicle 1, or the like. If the control termination condition is satisfied, the processing proceeds to step S6, and the image data generator 20 terminates the control illustrated in FIG. 10. On the other hand, if the control termination condition is not satisfied, the image data generator 20 repeats step S2 to step S5.

<Effects of Image Data Generator>

As one aspect of the above-described embodiment, the image data generator 20 is for the assistance system 10. The assistance system 10 assists a rider with driving the lean vehicle 1. The image data generator 20 has the input section 21, the first data generating section 22, and the second data generating section 22. The input section 21 is configured to receive the imaging data 30 from the imaging device 11. The imaging device 11 is configured to detect an environment around the lean vehicle 1. The first data generating section 22 is configured to generate the first image data 31 by shifting the imaging data 30 in the vertical direction. The second data generating section 23 is configured to generate the second image data 32 by rotating the first image data 31.

In the thus-configured image data generator 20, the first image data 31 is calculated by subjecting the imaging data 30 of the imaging device 11 to the first data generation at least in the vertical direction. Subsequently, the image data generator 20 generates the second image data 32 by rotating the first image data 31. The second image data 32 is used to determine whether it is necessary to perform the drive assistance. By generating the second image data 32 as described above, it is possible to reduce the calculation amount for the second data generation of the image data in comparison with the conventional calculation amount. Thus, the thus-configured image data generator 20 can suppress the delay in the initiation of the rider assistance operation in the assistance system 10 in comparison with the conventional assistance system.

The description has been made so far on the image data generator 20 according to this embodiment. However, the image data generator according to the present disclosure is not limited to that in the description of this embodiment. For example, in regard to the image data generator according to the present disclosure, only a part of this embodiment may be implemented. In addition, for example, the image data generator according to the present disclosure may be used in an assistance system including an imaging device that detects at least environment behind the lean vehicle.

REFERENCE SIGNS LIST

1: Lean vehicle
2: Handlebar
3: Front wheel

4: Suspension
10: Assistance system
11: Imaging device
12: Controller
20: Image data generator
21: Input section
22: First data generating section
23: second data generating section
24: Storage section
30: Imaging data
31: First image data
32: Second image data
33: Area
40: Travel state detector
50: Table
101: Image data (conventional)

The invention claimed is:

1. An assistance system (10) for assisting a rider with driving a lean vehicle (1), the system comprising:
an image data generator (20) that includes:
a computer that is configured to
receive an imaging data (30) from an imaging device (11), the imaging device (11) configured to detect an environment around the lean vehicle (1);
generate a first image data (31) by shifting the imaging data (30) in a vertical direction; and
generate a second image data (32) by rotating the first image data (31), wherein the computer is further configured to determine a shift amount between the imaging data (30) and the first image data (31) based on posture information of the lean vehicle (1) in a pitching direction, wherein
the posture information in the pitching direction is an expansion/compression amount of a suspension (4) on a side of a front wheel (3) of the lean vehicle (1), and
a controller that controls the lean vehicle (1) by performing at least one assistance operation selected from a group consisting of an emergency braking function and a cruise travel function.

2. The assistance system (10) according to claim 1, wherein
the posture information in the pitching direction is a pitching angle of the lean vehicle (1).

3. The (20) assistance system (10) according to claim 1, wherein
the computer is configured to determine a shift amount between the imaging data (30) and the first image data (31) based on the imaging data (30).

4. The assistance system (10) according to claim 1, wherein
the computer is configured to determine a rotation amount between the first image data (31) and the second image data (32) based on posture information of the lean vehicle (1) in a tilting direction.

5. The assistance system (10) according to claim 1, wherein the computer is configured to generate the first image data (31) by:
receiving coordinate information of the first image data (31)
performing an image conversion; and
outputting coordinate information of the imaging data (30).

6. The assistance system (10) according to claim 1, wherein the computer is configured to generate the first image data (31) by:
receiving coordinate information of the imaging data (30);
performing an image conversion; and
outputting coordinate information of the first image data (31).

7. The assistance system (10) according to claim 1, wherein the computer
is configured to generate the second image data (32) by receiving coordinate information of the second image data (32);
performing an image conversion; and
outputting the coordinate information of the first image data (31).

8. The assistance system (10) according to claim 1, wherein the computer
is configured to generate the second image data (32) by receiving coordinate information of the first image data (31);
performing an image conversion; and
outputting coordinate information of the second image data (32).

9. The assistance system (10) according to claim 1, the computer further configured to:
store a table (50) in which values of sines and values of cosines at plural angles are saved; and
use the table (50) when generating the second image data (32).

10. An assistance system (10) for assisting a rider with driving a lean vehicle (1), the system comprising:
an image data generator (20) that includes:
a computer that is configured to
receive an imaging data (30) from an imaging device (11), the imaging device (11) configured to detect an environment around the lean vehicle (1);
generate a first image data (31) by shifting the imaging data (30) in a vertical direction; and
generate a second image data (32) by rotating the first image data (31), wherein the computer is further configured to determine a shift amount between the imaging data (30) and the first image data (31) based on posture information of the lean vehicle (1) in a pitching direction, and
a controller that controls the lean vehicle (1) by performing at least one assistance operation selected from a group consisting of an emergency braking function and a cruise travel function, wherein
the posture information in the pitching direction is acceleration/deceleration in a front-rear direction of the lean vehicle (1).

11. An assistance system (10), for assisting a rider with driving a lean vehicle (1), the system comprising:
an image data generator (20) that includes:
a computer that is configured to
receive an imaging data (30) from an imaging device (11), the imaging device (11) configured to detect an environment around the lean vehicle (1);
generate a first image data (31) by shifting the imaging data (30) in a vertical direction; and
generate a second image data (32) by rotating the first image data (31), wherein the computer is further configured to determine a shift amount between the imaging data (30) and the first image data (31) based on posture information of the lean vehicle (1) in a pitching direction, and
a controller that controls the lean vehicle (1) by performing at least one assistance operation selected from a group consisting of an emergency braking function and a cruise travel, wherein the imaging device (11) moves with a handlebar (2) of the lean vehicle (1) while the imaging device (11) is mounted in the lean vehicle (1), and the computer is configured to determine the shift amount between the imaging data (30) and the first image data (31) based on the posture information in the pitching direction and a steering angle of the lean vehicle (1).

12. An image data generation method for an assistance system (10), the assistance system assisting a rider with driving a lean vehicle (1), the image data generation method comprising:

imputing (S2) an imaging data (30) detected by an imaging device (11), the imaging device (11) configured to detects an environment around the lean vehicle (1);

generating (S3) a first image data (31) by shifting the imaging data (30) along a vertical direction; and generating (S4) a second image data (32) by rotating the first image data (31), wherein a computer is further configured to determine a shift amount between the imaging data (30) and the first image data (31) based on posture information of the lean vehicle (1) in a pitching direction, wherein the posture information in the pitching direction is an expansion/compression amount of a suspension (4) on a side of a front wheel (3) of the lean vehicle (1), and a controller performing at least one assistance operation selected from the group consisting of an emergency braking function, and a cruise travel function.

13. The image data generation method according to claim 12, the image data generation method comprising:

determining whether performance of a rider assistance operation is necessary based on the second image data (32); and performing the rider assistance operation when the rider assistance operation is determined necessary.

* * * * *